G. J. KALBERER AND J. A. WEIGEL.
CASTER.
APPLICATION FILED JULY 27, 1920.

1,385,947.

Patented July 26, 1921.

Witness
Francis E. Allen.

Inventors:
George J. Kalberer
John A. Weigel
By Word & Word
Attorneys

UNITED STATES PATENT OFFICE.

GEORGE J. KALBERER AND JOHN A. WEIGEL, OF HAMILTON, OHIO, ASSIGNORS TO THE HAMILTON CASTER & MANUFACTURING COMPANY, OF HAMILTON, OHIO, A CORPORATION OF OHIO.

CASTER.

1,385,947.      Specification of Letters Patent.      Patented July 26, 1921.

Application filed July 27, 1920. Serial No. 399,252.

*To all whom it may concern:*

Be it known that we, GEORGE J. KALBERER and JOHN A. WEIGEL, citizens of the United States, and residing at Hamilton, in the county of Butler and State of Ohio, have invented a new and useful Improvement in Casters, of which the following specification is a full disclosure.

This invention relates to double-wheeled casters and provides a combination of parts which can be easily and quickly assembled to form a caster of great strength and compactness.

An object of the invention is to eliminate the use of ball-bearings and yet to retain all of the advantages of that class of casters, in regard to swiveling and general ease of operation.

Other objects are to reduce the number of parts to a minimum, and to provide a simple assembly arrangement of the same, in which only three riveting operations are necessary, one such operation only being needed to secure the swiveling means in operative position.

An additional object is to design the parts of the caster in such a manner that two of same can be cast, and that the third may be automatically machined, thus reducing the cost of production.

Additional objects and certain advantages will be set forth in the description, and special reference is made to the drawings, forming a part of this specification, in which.

Figure 4:
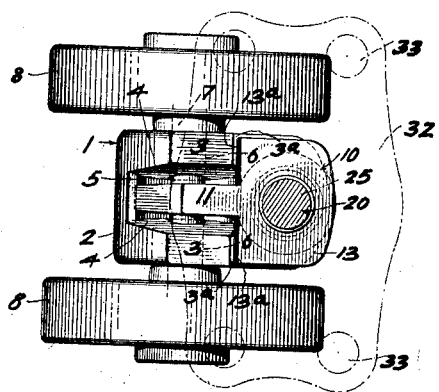
Fig. 4 is a plan section taken on line 4, 4, Fig. 1.
Figure 3:
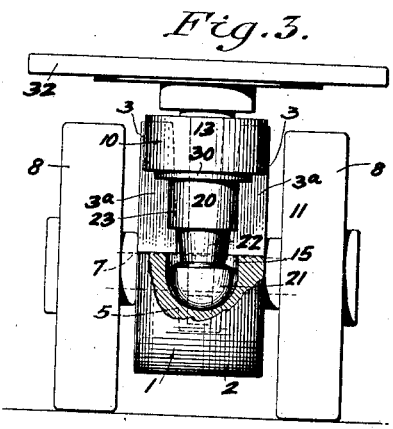
Fig. 3 is a rear elevation.

In carrying out our invention, we provide a base-casting 1, designed to support and to position the movable parts of the caster, and the said base is composed of a body portion 2, vertical projections 3, spaced apart, and having their inner faces inclined with respect to each other as at 4, to form a substantially V-shaped cavity 5, open at its top and of greatest width at that portion.

Traversing the projections 3 at right angles to the side faces of the same are horizontal bearing openings 6 for the reception of a wheel shaft 7, the said shaft passing through the cavity 5 and beyond the side faces of the body portion 2, to form pintles about which the said wheels 8 are mounted for rotation.

Figures 5, 6:
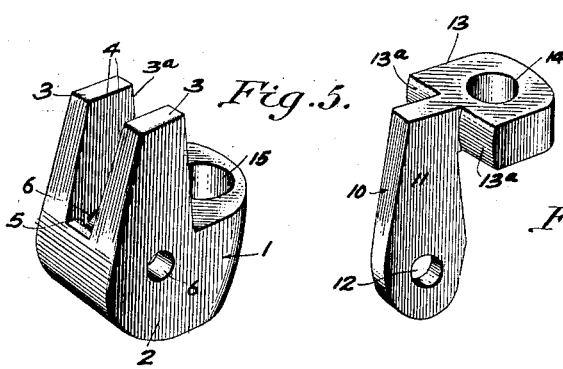
Figs. 5, 6 and 7 are detail perspective views of respectively the base-casting, the swivel-shank and the swivel-post.
Figure 7:
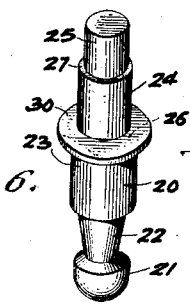

Within the cavity 5 is placed a swivel-shank generally designated 10, having a tapered attachment portion 11, the said portion being of less width than that of the space between the projections 3, in order to provide for lateral motion therebetween, and the side configuration of the said attachment portion 11 conforms to that of the side configuration of cavity 5, but is of smaller dimensions. An opening 12 of larger diameter than the shaft 7, traverses the portion 11, and the shaft 7 passes therethrough, (see Fig. 1). A horizontal head 13 integral with the portion 11 is provided with a cylindrical opening 14 for the reception of the section 24 of the swivel-post 20. Viewed in plan, the configuration of the swivel shank 10 is substantially T-shaped, (see Figs. 4 and 6), and portions 13ª of the head 13, yieldingly abut the faces 3ª of the projections 3. The swivel post 20 is composed of a bulb-shaped head 21, designed to be seated within a bowl-shaped cavity 15 formed in the upper face of the body portion 2, the said bowl-shaped cavity being of slightly larger dimensions than the bulb-shaped head, to allow for a rocking movement of the swivel-post. A shank 22 projects upwardly from the bulb-shaped head 21, and above the said shank are successively reduced cylindrical portions 23, 24, 25, the top surfaces of the portions 23, 24, forming seats 26, 27, for the purposes hereinafter described.

Upon the seat 26 and surrounding the portion 24 is a washer 30, upon which rests the head 13, and above the portion 24, rotatively surrounding the portion 25 and resting upon the seat 27, is an attachment plate 32 provided with openings 33 for the reception of fastening means to be used for securing the said plate and its connected parts to a body.

In assembling the caster, the lower end of the swivel post is set within the cavity 15 of the body 2, the opening 14 in the head 13 is placed about the portion 24 and the shank inserted into the cavity 5, with its opening in alinement with the openings 6; the wheel-shaft 7 is then inserted through the alined openings 6 and 12, and the wheels riveted as at 40; the plate 32, is then placed in position resting upon the shoulder or seat 27 and riveted as at 41. The shaft 7 is generally riveted at one end and one of the wheels is placed upon the shaft and against the rivet head preparatory to the assembly.

Figure 1:
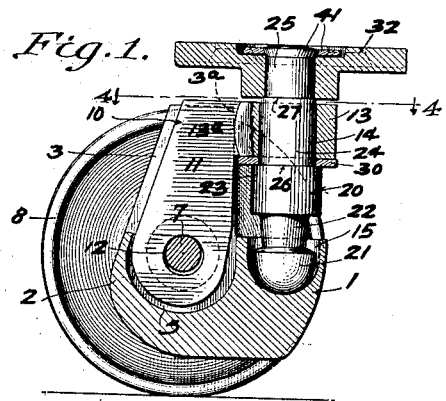
Figure 1 is a central vertical section of our improved caster.
Figure 2:
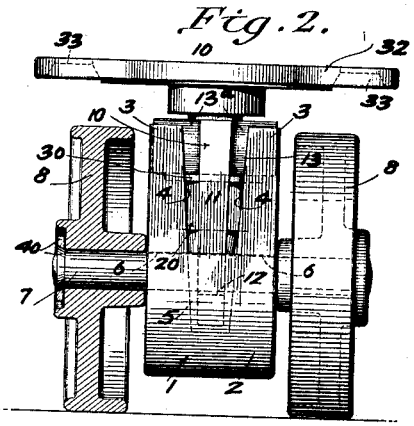
Fig. 2 is a front elevation of the same viewed at a right angle to Fig. 1.

As seen in Fig. 1, sufficient play of the swiveling means laterally to the shaft 7 is provided for by making the opening 12 of slightly larger diameter than the shaft 7; further lateral movement of the parts is prevented by the interaction of the faces 13ª with the surfaces 3ª.

Having described our invention, we claim:

1. In a device of the class described, the combination of rollers mounted upon a shaft, a carriage member mounted upon said shaft and between said rollers, a cavity within said carriage member traversed by said shaft, a shank projecting into said cavity and traversed by said shaft, a head attached to said shank and vertically traversed by a swivel-post, a second cavity in the said carriage loosely receiving the lower end of said swivel-post, and means for attaching said post to a body.

2. In a device of the class described, a pair of rollers mounted upon a shaft, a carriage mounted upon said shaft and between said rollers, a V-shaped cavity within said carriage, traversed by said shaft, a V-shaped shank within said cavity, of less width than the same, and capable of lateral movement within said cavity and about said shaft, a swivel-post mounted for rocking movement within a second cavity in said carriage, and traversing a head of the said V-shaped shank, and means for connecting the said swivel-post to a body.

3. In a device of the class described, a carriage member providing a V-shaped socket and a bowl-shaped pocket, a V-shaped shank member within said V-shaped socket of less width than the same and having a head portion, a shaft traversing said socket and said V-shaped shank, a swivel-post stepped in said bowl-shaped pocket and traversing said head portion of the said V-shaped shank member, and means for attaching said swivel-post to a body.

4. In a device of the class described, a swivel-supporting member, provided with a pair of spaced extensions, a bowl-shaped socket adjacent said extensions, a shank freely engaged between said extensions, a head formed upon said shank and abutting said extensions, a vertical opening through said head, a swivel-post loosely stepped within said bowl-shaped socket and traversing said head, a shoulder upon said swivel-post abutting said head, and a wheel shaft supported in said swivel supporting member and loosely traversing said shank.

5. In a swivel-caster, a carriage member, having space extensions and a bowl-shaped socket, a swivel-shank between said extension of less width than the extension spacing, and provided with a head portion transversely abutting said extension, a roller shaft supported in said member and loosely traversing said swivel-shank, a swivel-post stepped in said bowl-shaped socket and traversing the said head portion, a shoulder upon the said swivel-post abutting said head portion, and means above said head portion for rotatively attaching the said swivel-post to a body.

In witness whereof, we hereunto subscribe our names, as attested by the two subscribing witnesses.

GEORGE J. KALBERER.
JOHN A. WEIGEL.

Witnesses:
B. R. MILLIKIN,
L. A. BECK.